(12) United States Patent
Lee et al.

(10) Patent No.: US 11,426,829 B2
(45) Date of Patent: Aug. 30, 2022

(54) MACHINE TOOL

(71) Applicant: HYUNDAI WIA CORPORATION, Changwon-si (KR)

(72) Inventors: Dal Ho Lee, Seoul (KR); Dennis Korff, Bibensheim (DE); Erik Nowak, Mannheim (DE); Sebastian Spengler, Bischofsheim (DE); Je Wang Kim, Cheongsong-gun (KR); Behzad Jalizi, Griesheim (DE); Marc Sieber, Stadtecken-Elsheim (DE); Johannes Hoerner, Darmstadt (DE); Thomas Schneider, Riedstadt (DE); Sang Mook Han, Seoul (KR)

(73) Assignee: HYUNDAI WIA CORPORATION, Changwon-si (KR)

( * ) Notice: Subject to any disclaimer, the term of this patent is extended or adjusted under 35 U.S.C. 154(b) by 57 days.

(21) Appl. No.: 16/766,860

(22) PCT Filed: Dec. 28, 2017

(86) PCT No.: PCT/KR2017/015621
§ 371 (c)(1),
(2) Date: May 26, 2020

(87) PCT Pub. No.: WO2019/107663
PCT Pub. Date: Jun. 6, 2019

(65) Prior Publication Data
US 2020/0298358 A1 Sep. 24, 2020

(30) Foreign Application Priority Data
Nov. 30, 2017 (KR) .......................... 10-2017-0163012

(51) Int. Cl.
*B23Q 1/01* (2006.01)
*B23Q 3/155* (2006.01)
*B23Q 1/62* (2006.01)

(52) U.S. Cl.
CPC ............. *B23Q 1/017* (2013.01); *B23Q 1/015* (2013.01); *B23Q 1/626* (2013.01); *B23Q 3/1556* (2013.01);
(Continued)

(58) Field of Classification Search
CPC ............... Y10T 408/91; Y10T 408/935; Y10T 409/30896; Y10T 409/309576;
(Continued)

(56) References Cited

U.S. PATENT DOCUMENTS 4,621,407 A * 11/1986 Suzuki ................... B23Q 1/015
29/26 A
5,678,291 A * 10/1997 Braun .................... B23Q 1/015
29/26 A
(Continued)

FOREIGN PATENT DOCUMENTS

CN 103231246 A 8/2013
CN 104117858 A 10/2014
(Continued)

OTHER PUBLICATIONS

EPO Machine Translation of CN 205394034 U—"Multiaxis computer numerical control tool comprises a main shaft box which is set on slide in an axis slide seat along vertical direction, and electric machine coil which is seton outside", Jul. 27 (Year: 2016).*
(Continued)

*Primary Examiner* — Boyer D Ashley
*Assistant Examiner* — Michael Vitale
(74) *Attorney, Agent, or Firm* — Knobbe, Martens, Olson & Bear, LLP

(57) ABSTRACT

Disclosed is a machine tool including: a base having a pair of first-axial slides facing each other at both sides of a
(Continued)

mounting space; a saddle coupled to the first-axial slides of the base to slide in a first axis direction and having a pair of second-axial slides facing each other; a crosspiece coupled to the second-axial slides of the saddle to slide in a second axis direction and having a pair of third-axial slides facing each other; a vertical ram coupled to the third-axial slides of the crosspiece to slide in a direction perpendicular; and a table disposed in the mounting space of the base to be able to rotate relative to the base.

9 Claims, 6 Drawing Sheets

(52) U.S. Cl.
CPC .... *Y10T 408/935* (2015.01); *Y10T 409/30896* (2015.01); *Y10T 409/309632* (2015.01); *Y10T 483/1733* (2015.01)

(58) Field of Classification Search
CPC .... Y10T 409/309632; Y10T 483/1733; B23Q 1/015; B23Q 1/017; B23Q 1/626; B23Q 11/0042; B23Q 11/0053; B23Q 11/0067; B23Q 11/0875
USPC ........ 409/168, 224, 235, 236; 408/234, 237; 483/30
See application file for complete search history.

(56) References Cited

U.S. PATENT DOCUMENTS

| | | | | |
|---|---|---|---|---|
| 7,255,519 | B2 * | 8/2007 | Tanoue | B23Q 1/012 409/134 |
| 7,356,895 | B2 * | 4/2008 | Ota | B23C 1/002 269/58 |
| 7,462,144 | B2 * | 12/2008 | Braun | B23Q 3/15706 483/23 |
| 7,721,398 | B2 * | 5/2010 | Bernhard | B23Q 1/66 29/33 P |
| 8,181,321 | B2 * | 5/2012 | Tullmann | B23Q 1/44 29/27 C |
| 9,757,832 | B1 * | 9/2017 | Chiu | B23Q 1/621 |
| 2002/0006764 | A1 * | 1/2002 | Hanisch | B23Q 1/52 451/1 |
| 2004/0049902 | A1 * | 3/2004 | Hagstrom | B23Q 1/626 29/26 A |
| 2004/0090126 | A1 * | 5/2004 | Hsu | B23Q 9/0078 310/12.13 |

FOREIGN PATENT DOCUMENTS

| | | | | |
|---|---|---|---|---|
| CN | 204321602 U | 5/2015 | | |
| CN | 205394034 U | 7/2016 | | |
| CN | 206084418 U | 4/2017 | | |
| EP | 1634675 A1 * | 3/2006 | ......... | B23Q 11/0042 |
| JP | 2004-130468 A | 4/2004 | | |
| JP | 2007-296613 A | 11/2007 | | |
| JP | 2015-062973 A | 4/2015 | | |
| KR | 10-2009-0104902 A | 10/2009 | | |
| KR | 10-1552906 B1 | 9/2015 | | |
| KR | 20-0480386 Y1 | 5/2016 | | |
| KR | 10-2016-0089170 A | 7/2016 | | |
| KR | 10-2016-0120512 A | 10/2016 | | |
| WO | 2012/076346 A1 | 6/2012 | | |
| WO | WO-2014178559 A1 * | 11/2014 | ............. | B23Q 1/012 |

OTHER PUBLICATIONS

Extended European Search Report of European Patent Application No. 17933251.5—8 pages (dated Jul. 9, 2021).
Office Action of Japanese Patent Application No. 2020-529557—11 pages (dated Jun. 29, 2021).
Office Action of Chinese Patent Application No. 201780097067.3—5 pages (dated Apr. 26, 2021).
International Search Report of corresponding PCT Application No. PCT/KR2017/015621—4 pages (dated Aug. 29, 2018).
Notification of Reason for Refusal issued in KR Patent Application No. KR 10-2017-0163012 dated Feb. 13, 2019.
Notice of Allowance issued in KR Patent Application No. KR 10-2017-0163012 dated Feb. 24, 2019.

* cited by examiner

MACHINE TOOL

TECHNICAL FIELD

The present invention relates to a machine tool and, more particularly, to a machine tool that has a simple structure because it is a mono-block type in which a bed and a column are integrated and that can perform high-accuracy/high-speed machining by minimizing vibration and thermal displacement.

BACKGROUND ART

In general, a machine tool means equipment that cuts workpieces by moving in three axial directions with respect to a spindle. Recently, the shapes required for workpieces become more complicated, but a demand for improving productivity to be able to produce complicated shapes within a short time by minimizing the time that is used for machining is increased. Accordingly, a demand has rapidly increased for a 5-axis machining tool can tilt and rotate a table in addition to performing 3-axis machining.

A 5-axis machine tool generally includes: three linear axes X, Y, and Z arranged perpendicularly at a machining center point (TCP) that is a so-called tool center point where a tool and a workpiece meet around a driving unit; a rotary axis holding and rotating a workpiece 360 degrees; and a tilting axis rotating a table for supporting and fixing a workpiece to predetermined angles (+, −).

Meanwhile, in 5-axis machine tools, a column, a bed, and a saddle that are necessary structures are independently configured and are connected to one another through additional couplers, and a table is also separately combined with the bed. As described above, since the necessary structures are not integrated and coupled to one another through additional couplers, vibration or thermal displacement generated by the spindle are not sufficiently removed and influence the entire structure, which causes a problem that the machining precision decreases.

In particular, displacement that is generated in the Y-axial direction in a Z-Y plane overlap, and such Y-axial displacements generally show values larger than "0". Such overlap displacement is usually generated by complex reasons including vibration and thermal influence during a machining process. When overlap displacement is generated, it greatly influences the positioning accuracy between the front end of a tool mounted on a spindle and the machining center of a workpiece on a table, which is the main factor that deteriorates the quality of the workpiece.

Further, such overlap displacement is large and generated more irregularly, as the machining speed and the cutting amount are increased, and there is a limit in removing the overlap displacement only using additional means. Accordingly, this means that the structure of a machine tool itself should be designed to be able to minimize overlap displacement in order to improve the machining quality and productivity in 5-axis machining.

The description provided above as a related art of the present invention is just for helping understanding the background of the present invention and should not be construed as being included in the related art known by those skilled in the art.

A related art document may be referred to KR10-2016-0120512 (A).

DISCLOSURE

Technical Problem

The present invention has been made in an effort to solve the problems and an object of the present invention is to provide a machine tool that can improve the quality of a workpiece and can improve productivity because the structure thereof is designed to be able to minimize overlap displacement to improve machining quality and productivity in 5-axis machining.

Technical Solution

In order to achieve the objects, a machine tool according to the present invention includes: a base having a mounting space inside, in which a workpiece is mounted, having shaft holes through walls facing each other, and having a pair of first-axial slides facing each other at both sides of the mounting space; a saddle coupled to the first-axial slides of the base to slide in a first axis direction and having a pair of second-axial slides disposed in a direction crossing the first axis direction and facing each other; a crosspiece coupled to the second-axial slides of the saddle to slide in a second axis direction and having a pair of third-axial slides disposed perpendicular to a plane, which is formed by the first axis and the second axis, and facing each other; a vertical ram coupled to the third-axial slides of the crosspiece to slide in a direction perpendicular to the plane formed by the first axis and the second axis, and holding tools mounted at an end thereof to machine a workpiece; and a table disposed in the mounting space of the base to be able to rotate relative to the base through the shaft holes of the base.

The facing walls of the base may be provided as a pair, the first-axial slides may be formed at upper ends of the walls, respectively, an intermediate wall may extend from a wall to the other wall, and the mounting space may be defined by the pair of facing walls and the intermediate wall.

A top surface of the intermediate wall may be an inclined surface having a downward slope toward the mounting space, so chips produced when a workpiece is machined may be collected.

A work space may be defined ahead of the facing walls, an automatic tool changer having tools for machining may be disposed behind the facing walls, and front surfaces of the facing walls may be inclined such that a lower end is positioned rearward further than an upper end, thereby defining the work space.

Support feet may be formed in a front-rear direction at a lower end of the base, and the support feet and the walls may be arranged to make a triangle.

The first-axial may slide formed such that rear portions are longer than front portions from centers of the shaft holes.

The saddle may have a hexahedral box shape and has portions, which are connected to the first-axial slides, at edges of a bottom thereof, and the second-axial slides may be formed at edges of a top surface to be perpendicular to the first-axial slides.

A vertical through-hole may be formed in the vertical ram, and edges having a curvature may be formed on an inner surface of the vertical through-hole.

Portions connected to the second-axial slides of the crosspiece and portions connected to the third-axial slides of the vertical ram may make a right angle.

Slides may include the first-axial slides, the second-axial slides, and the third-axial slides and may include: sliding rails that longitudinally extend; and sliding blocks that are pieces respectively coupled to the sliding rails to slide along the sliding rails, and the sliding rails and the sliding blocks may be installed at opposite positions.

The table may rotate relative to the base by the shaft holes and may rotate 360 degrees.

Advantageous Effects

According to the machine tool of the present invention described above, machining is possible in the X-axial direction, Y-axial direction, and Z-axial direction and a table can be tilted and rotated in one machine tool, and structures are symmetrically formed, so there is an effect that it is possible to increase precision by putting reference points at both sides, it is possible to reduce an error because it is possible to put one central axis, and it is possible to improve precision of a workpiece.

Since one base has the functions of both of a bed and a column, there is an advantage that the structure is simplified and the manufacturing cost is reduced. Further, since there is no mechanical joint between a bed and a column, there is an advantage that it is possible to minimize a decrease in strength.

Further, since the structures of the machine tools of the present invention are symmetrically formed, forces generated by the structures flow in the directions considered in the design step without disconnection. Accordingly, there is an advantage that displacement that is generated by vibration and thermal influence when the machine is operated is minimized, so high machining precision is achieved and dynamic performance is maximized, whereby it is possible to increase productivity.

Further, chips produced from a workpiece is guided to be able to freely drop to the ground without accumulating in the machine, so there is an advantage that it is very easy to handle the chips. Further, since the top surface of the column is formed to be positioned forward further than the bottom surface, a worker can easily access the machine tool. Further, since the rear portions of the first-axial slides are formed longer than the front portions, a heavy workpiece can be installed in the machine without interference with other components, so there is an advantage that work is more conveniently performed.

MODE FOR INVENTION

A machine tool according to an exemplary embodiment of the present invention is described hereafter with reference to the accompanying drawings.

Figure 1:
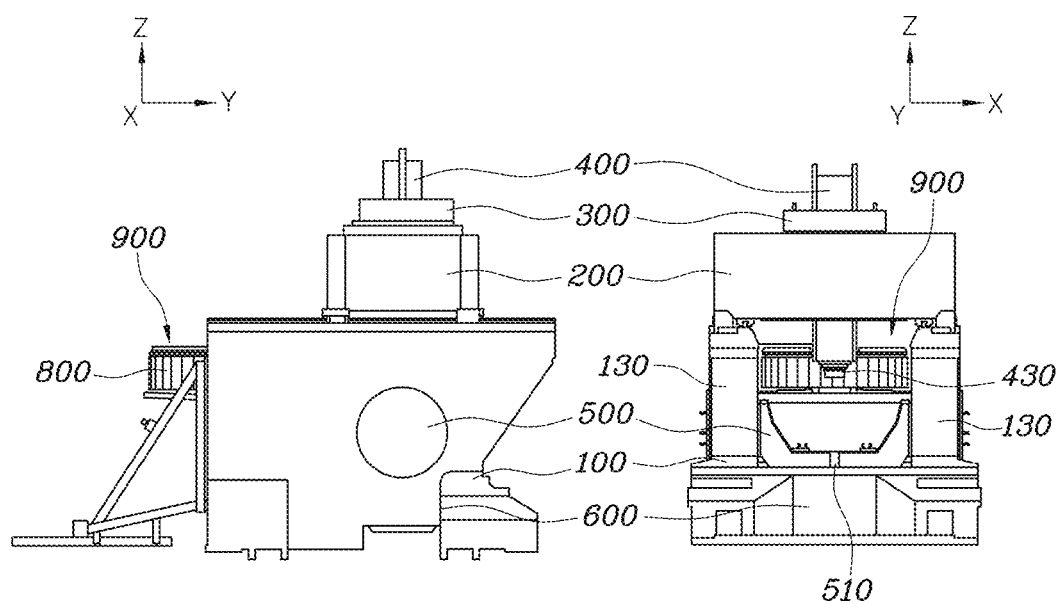
FIG. 1 is a view showing a machine tool according to an embodiment of the present invention.
Figure 2:
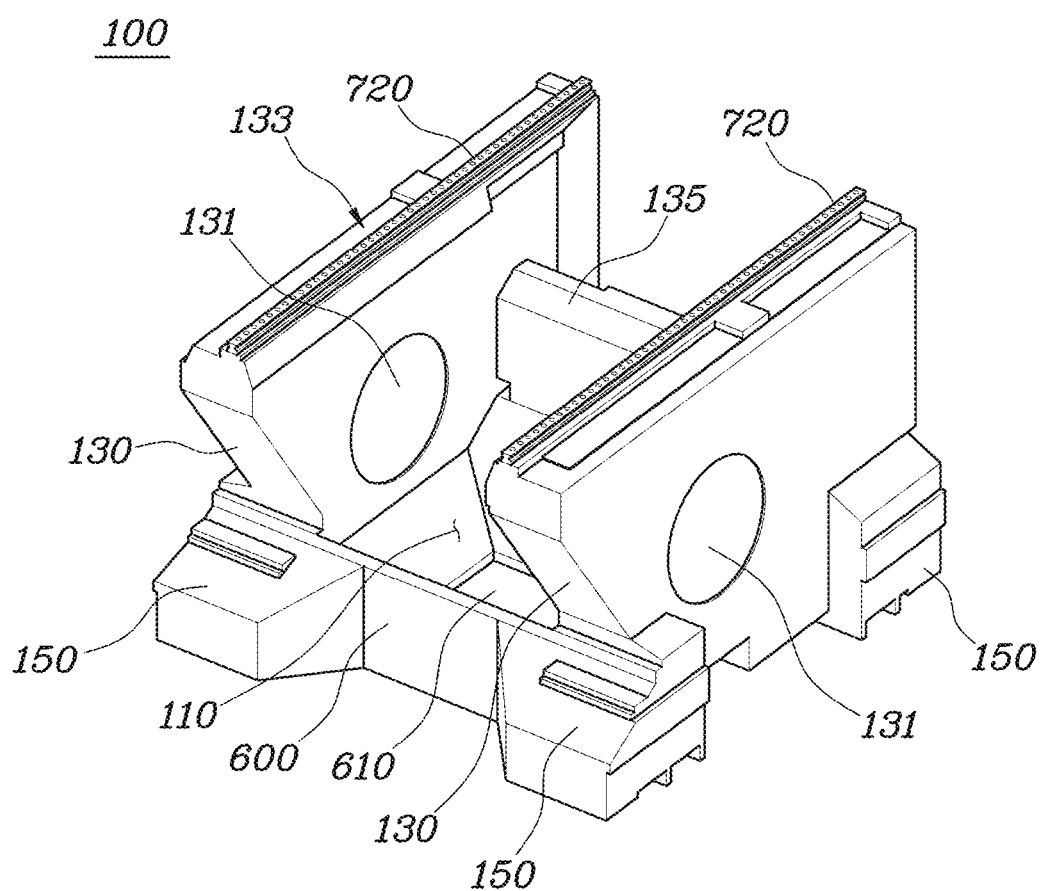
FIG. 2 is a view showing a base of FIG. 1.
Figure 3:
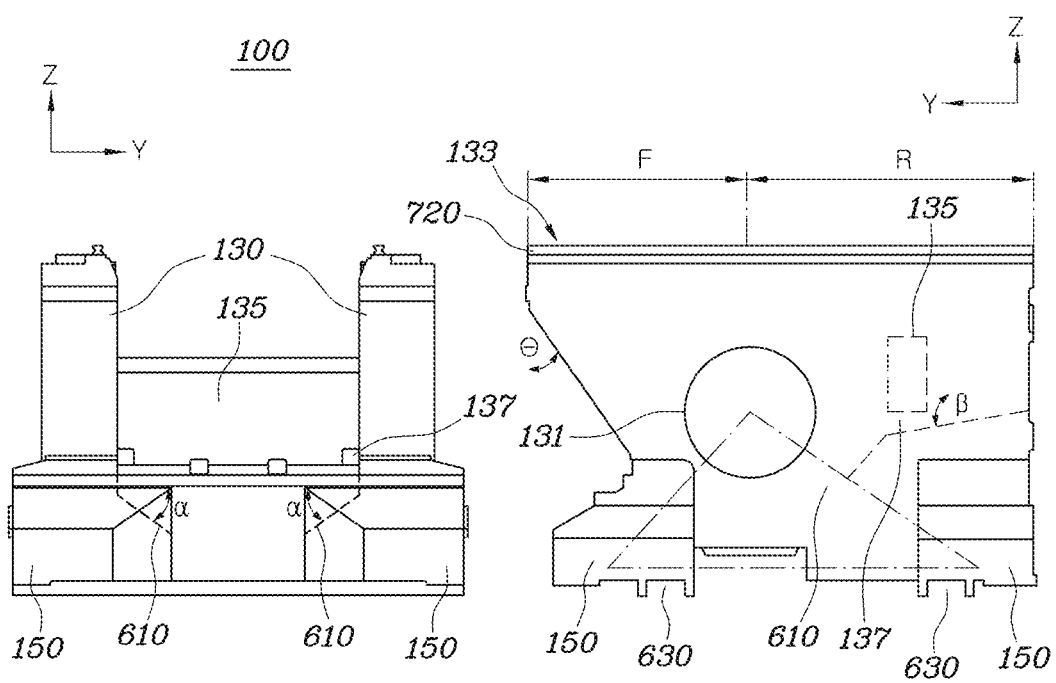
FIG. 3 is a front and side view of FIG. 2.
Figure 4:
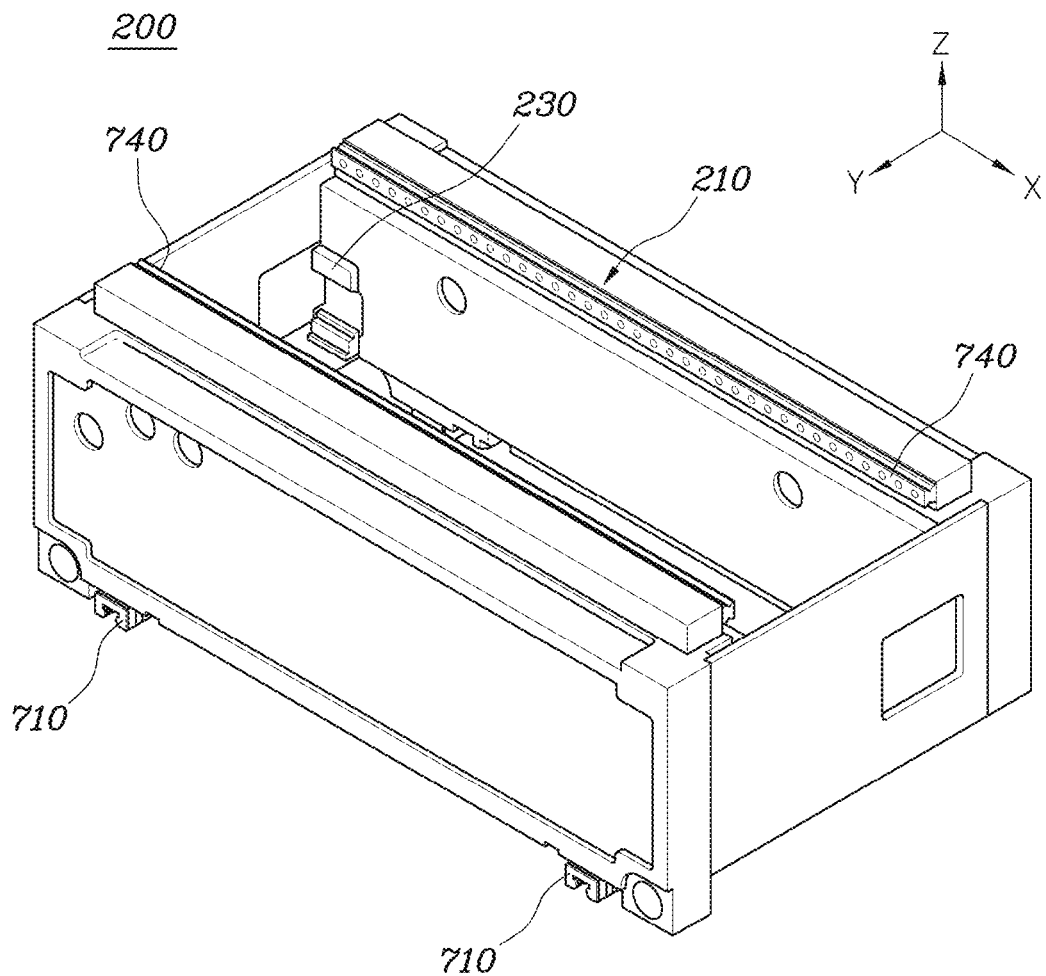
FIG. 4 is a view showing a saddle of FIG. 1.
Figure 5:
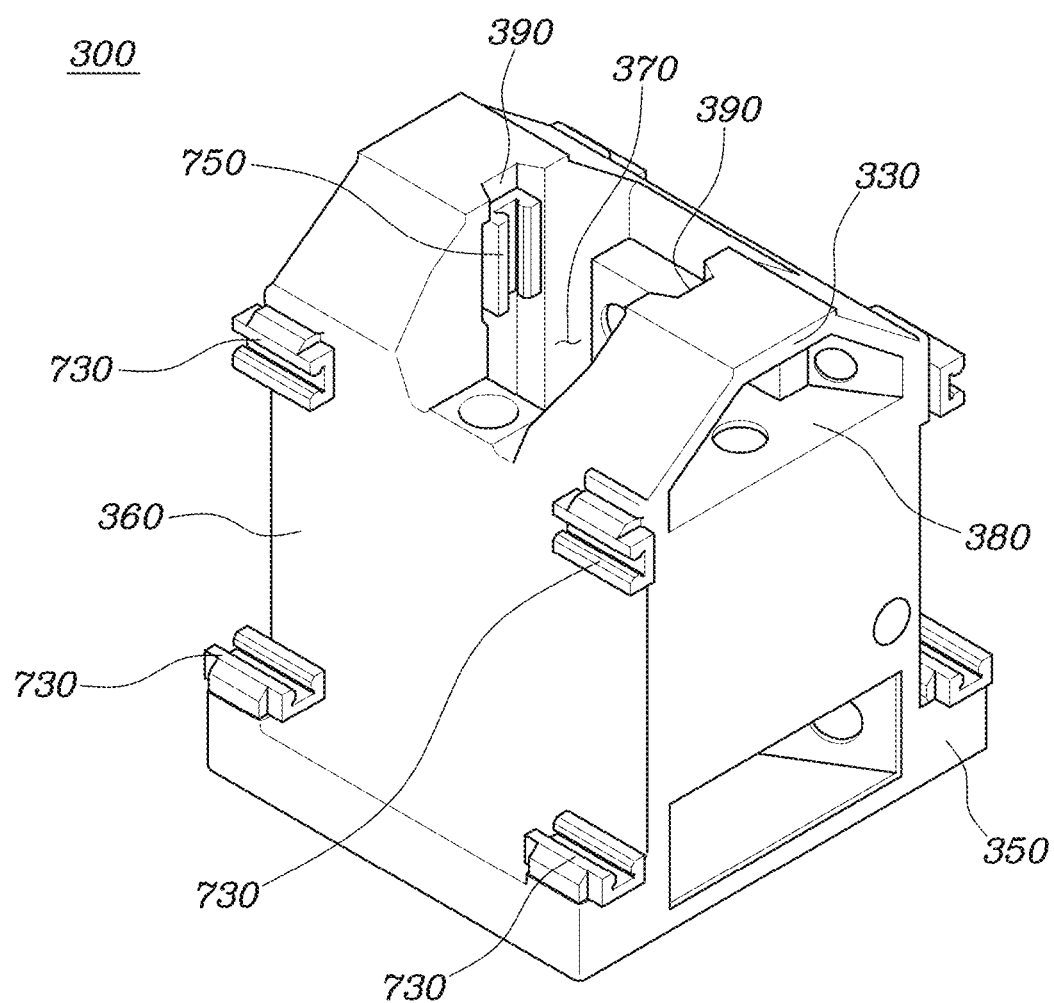
FIG. 5 is a view showing a crosspiece of FIG. 1.
Figure 6:
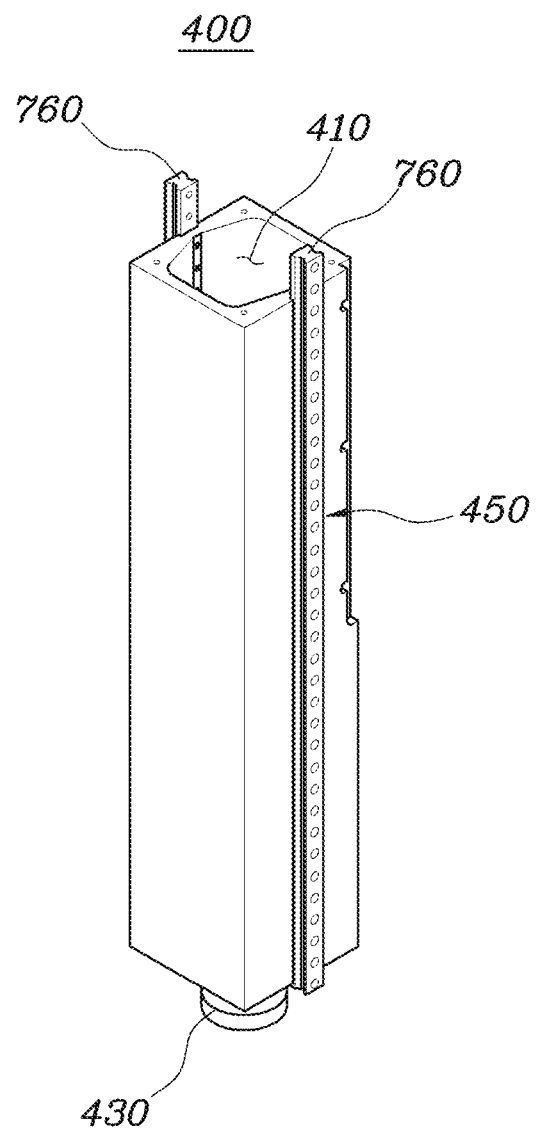
FIG. 6 is a view showing a vertical ram of FIG. 1.

FIG. 1 is a view showing a machine tool according to an embodiment of the present invention, FIG. 2 is a view showing a base 100 of FIG. 1, and FIG. 3 is a front and side view of FIG. 2. Further, FIG. 4 is a view showing a saddle 200 of FIG. 1, FIG. 5 is a view showing a crosspiece 300 of FIG. 1, and FIG. 6 is a view showing a vertical ram 400 of FIG. 1.

A first axis may be a Y-axis, a second axis may be an X-axis, and a third axis may be a Z-axis in this description, but the directions can be freely changed, depending on the design or environment, so they are referred to as the first axis, the second axis, and the third axis in this specification.

As shown in FIGS. 1 and 2, a machine tool according to an embodiment of the present invention includes: a base 100 having a mounting space 110 inside, in which a workpiece is mounted, having shaft holes 131 through walls facing each other, and having a pair of first-axial slides 133 facing each other at both sides of the mounting space; a saddle 200 coupled to the first-axial slides 133 of the base 100 to slide in a first axis direction and having a pair of second-axial slides 210 disposed in a direction crossing the first axis direction and facing each other; a crosspiece 300 coupled to the second-axial slides 210 of the saddle 200 to slide in a second axis direction and having a pair of third-axial slides 450 disposed perpendicular to a plane, which is formed by the first axis and the second axis, and facing each other; a vertical ram 400 coupled to the third-axial slides 450 of the crosspiece 300 to slide in a direction perpendicular to the plane formed by the first axis and the second axis, and holding tools 800 mounted at an end thereof to machine a workpiece; and a table 500 disposed in the mounting space 110 of the base 100 to be able to rotate relative to the base 100 through the shaft holes 131 of the base 100.

The base 100 of the present invention is shown in FIGS. 2 and 3. The base 100, which is also called a foundation, has the mounting space 110 inside in which a workpiece is mounted, and has the walls 130 facing each other, in which the mounting space 110 and the walls 130 at both sides are symmetrically formed. The facing walls 130 are provided as a pair, an intermediate wall 135 extends from a wall 130 to the other wall 130, and the mounting space 110 is defined by the pair of facing walls 130 and the intermediate wall 135. In particular, the top surface of the intermediate wall 135 is an inclined surface having a downward slope toward the mounting space 100, so chips produced when a workpiece is machined, cooling water, etc. are collected into the mounting space 110.

The pair of walls 130 facing each other may be the columns of common machine tools. The shaft hole 131 is formed through the center of each of the walls 130 facing each other and the pair of first-axial slides 133 is formed to face each other at both sides of the mounting space 110. The first-axial slides 133 may be formed at the upper ends of the walls 130. A work space is defined ahead of the walls 130 of the base 100 and a tool magazine 900 including an automatic tool changer (ATC) having tools 800 for machining is disposed behind the walls 130. The front surfaces of the walls 130 are inclined at a predetermined inclination angle θ such that the lower end is positioned rearward further than the upper end, so there is an advantage that a work space where a worker can easily perform work is defined, a worker can maximally easily access the table 500, and the installation area-to-stroke of the machine tool can be minimized The base 100 has a bed 600 that is seated on the ground. One opening 610 for discharging machined chips or cooling water is formed in the bed 600. A space in which the tool magazine 900 having the tool changer can be inserted is provided by a space defined behind the base 100 by the bed 600, the walls 130 and the intermediate wall 135. Support feet 150 are formed in the front-rear direction at the lower end of the base 100, in more detail, the lower end of the bed 600, and the support feet 150 and the walls 130 are arranged to make a triangle. The support feet 150 protrude a predetermined amount forward from the walls 130, whereby there is an effect that it is possible to more stably support the machine tool, it is possible to prevent force, which is generated between a tool 800 and a workpiece, from concentrating in any one direction or from being disconnected during machining, the force flows in a closed section with a predetermined directionality in the structure, and the strength of the entire structure can be increased. Even only by the structure of the base 100, mechanically vulnerable portions are removed in advance and stability against displacement due to vibration and heat is maximized, so there is an effect that influence by factors that decrease performance such as heat and vibration is minimized, thereby being able to maximize the machining performance and the machining quality.

The opening 610 is formed symmetrically to the walls 130 at both sides. The opening 610 has no specific step at the joints to the walls 130 at both sides and has inclination with a uniform inclination angle α to narrow downward. Accordingly, chips produced during machining can be dropped well and discharged out of the machine tool without being accumulated in the internal structure.

The first-axial slides 133 formed on the upper ends of the walls 130 of the base 100 are formed such that the rear portions are longer than the front portions from the centers of the shaft holes 131. Accordingly, the saddle 200 seated on the first-axial slides 133 can be further moved rearward in the first axis direction. Therefore, there is an advantage that it is possible to secure a sufficient space when installing rearward a tool that is used to load workpieces, particularly, heavy workpieces, and it is also possible to easily load even objects, which should be moved using equipment such as a gantry loader because they are heavy, after moving the saddle 200 rearward. Further, an actuator for the first-axial slides 133 is disposed ahead of the first-axial slides 133 and a worker performs work ahead of the machine tool because the work space is defined ahead of the base 100, so there is an advantage that it easy to attach/detach and maintain the actuator for the first-axial slides 133 of the present invention, as compared with the related art in which actuators are disposed at a rear side.

The top of the rear space of the base 100 defined by the intermediate wall 135 has an inclination angle β forward and one or more drain holes 137 are formed in the intermediate wall 135, so when remaining cooling water of the tools 800 mounted on the automatic tool changer (ATC) drops, the cooling water can be returned through the opening 610 without collecting there. Transport guides 630 in which a fork lift for transportation are formed in the front-rear direction on the bottom of the bed 600 and the transport guides 630 may be formed at one or more positions on the support feet 150 of the base 100. Though not shown in detail, a core hole for casting that is used for manufacturing the base 100 may be formed only through a top surface of a bottom surface. Accordingly, there is no unnecessary open portion except for the shaft hole 131 formed through the sides of the base 100 and the opening 610, thereby being able to further increase the strength of the structure itself.

The saddle 200 of the present invention is shown in FIG. 4. The saddle 200 is coupled to the first-axial slides 133 of the base 100 to slide in the first axis direction and has the pair of second-axial slides 210 facing each other and crossing the first axis. That is, the saddle 200 is combined with the base 100 from above the base 100 through the first-axial slides 133. As shown in the figures, the saddle 200 may have a hexahedral box shape and has portions, which are connected to the first-axial slides 133, at the edges of the bottom, and the second-axial slides 210 are formed at the edges of the top surface to be perpendicular to the first-axial slides 133. The surface on which the second-axial slides 210 are disposed is formed to have a predetermined thickness to be able to have sufficient structural strength, but the surface on which the portions connected to the first-axial slides 133 are mounted may be formed to have a small thickness. One or more first-axial slide blocks 710 coupled to the first-axial slides 133 so that the saddle 200 can slide in the first axis direction are disposed at the points of the saddle 200 connected to the first-axial slides 133.

One or more second-axial slides 210 are disposed at a lower portion of the surface on which the second-axial slides 210 are disposed, other than the edges of the top surface, so they can be more firmly supported when sliding in the second axis direction. Support members 230 for transmitting movement in the second axis direction may be disposed under the second-axial slides 210.

The crosspiece 300 is shown in FIG. 5. The crosspiece 300 is coupled to the second-axial slides 210 of the saddle 200 to slide in the second axis direction. The crosspiece 300 has the pair of third-axial slides 450 formed to face each other at both sides in a direction perpendicular to a plane formed by the first axis and the second axis. In particular, the crosspiece 300 is inserted in the saddle 200. The crosspiece 300 may be formed entirely in a block shape. A closed section 330 having a roof shape is formed at the upper portion of the crosspiece 300 and protrusions 350 extending at both sides in the first axis direction and having a predetermined thickness are formed under the closed section 330. An internal space 370 in which the vertical ram 400 is inserted and can be vertically moved is defined in the crosspiece 300. The crosspiece 300 has guide grooves 390 that are the portion connected to the third-axial slides 450. A window 380 being open in the second axis direction is formed at the closed section 330, so third-axial sliding blocks 750 that slide on the third-axial slides 450 are inserted through the window 380, spaced maximally from each other, and then attached to the guide grooves 390.

One or more second-axial sliding blocks 730 are disposed on the outer surfaces of both side walls 360 in the first axis direction or on the protrusions 350. Two second-axial sliding blocks spaced apart from each other may be formed in a set at the end of each part. Accordingly, force that is generated by operation of the crosspiece 300 uniformly flows along the closed section 330 without disconnection, so the structural strength is maximized. In particular, the closed section 330 is positioned higher than the second-axial sliding blocks 730, so the forces that are generated by the second-axial sliding blocks 730 and the third-axial sliding blocks 750 do not overlap in a first-second axial plane. Further, the third-axial sliding blocks 750 can be spaced apart from each other with a sufficient vertical gap, so the dynamic strength of an object conveyed by the third-axial sliding blocks 750 is improved.

The vertical ram 400 is shown in FIG. 6. The vertical ram 400 is coupled to the third-axial slides 450 of the crosspiece 300 to slide in the direction perpendicular to the plane formed by the first axis and the second axis, and a tool 800 for machining a workpiece is mounted at the end of the vertical ram 400. The end of the vertical ram 400 is positioned in the mounting space 110 of the base 100 and the table 500 is disposed under the tool 800. A vertical through-hole 410 is formed in the vertical ram 400. A spindle 430 on which a tool 800 is mounted may be inserted in the vertical through-hole 410 and a tool 800 may be mounted at the end of the spindle 430. Edges having a curvature are formed on the inner surface of the vertical through-hole 410, so force uniformly flows without disconnection and stress concentration is not generated, so the structural strength can be increased.

As shown in FIG. 1, the table 500 is disposed in the mounting space 110 of the base 100 and can rotate relative to the base 100 by the shaft holes 131 of the base 100. The table 500 can tilt by rotating relative to the base 100 by the shaft holes 131 and can rotate 360 degrees by a rotary shaft 510, so it is installed to be able to both tilt and rotate.

Slides 133, 210, and 450 including the first-axial slides 133, the second-axial slides 210, and the third-axial slides 450 respectively include: sliding rails 720, 740, and 760 that longitudinally extend; and sliding blocks 710, 730, and 750 that are pieces respectively coupled to the sliding rails 720, 740, and 760 to slide along the sliding rails 720, 740, and 760. In particular, the sliding rails 720, 740, and 760 and the sliding blocks 710, 730, and 750 may be alternately installed at opposite positions.

Therefore, according to the machine tool of the present invention described above, machining is possible in the X-axial direction, Y-axial direction, and Z-axial direction and a table can be tilted and rotated in one machine tool, and structures are symmetrically formed, so there is an effect that it is possible to increase precision by putting reference points at both sides, it is possible to reduce an error because it is possible to put one central axis, and it is possible to improve precision of a workpiece.

Since one base has the functions of both of a bed and a column, there is an advantage that the structure is simplified and the manufacturing cost is reduced. Further, since there is no mechanical joint between a bed and a column, there is an advantage that it is possible to minimize a decrease in strength.

Further, since the structures of the machine tools of the present invention are symmetrically formed, forces generated by the structures flow in the directions considered in the design step without disconnection. Accordingly, there is an advantage that displacement that is generated by vibration and thermal influence when the machine is operated is minimized, so high machining precision is achieved and dynamic performance is maximized, whereby it is possible to increase productivity.

Further, chips produced from a workpiece are guided to be able to freely drop to the ground without accumulating in the machine, so there is an advantage that it is very easy to handle the chips. Further, since the top surface of the column is formed to be positioned forward further than the bottom surface, a worker can easily access the machine tool. Further, since the rear portions of the first-axial slides are formed longer than the front portions, a heavy workpiece can be installed in the machine without interference with other components, so there is an advantage that work is more conveniently performed.

Although the present invention was provided above in relation to specific embodiments shown in the drawings, it is apparent to those skilled in the art that the present invention may be changed and modified in various ways without departing from the scope of the present invention, which is described in the following claims.

<Description of the Reference Numerals>

| 100: base | 110: mounting space |
|---|---|
| 130: wall | 131: shaft hole |
| 133: first-axial slide | 135: intermediate wall |
| 137: drain hole | 150: support foot |
| 200: saddle | 210: second-axial slide |
| 230: support member | 300: crosspiece |
| 330: closed section | 350: protrusion |
| 360: outer surface | 370: internal space |
| 380: window | 390: guide groove |
| 400: vertical ram | 410: vertical through-hole |
| 430: spindle | 450: third-axial slide |
| 500: table | 510: rotary shaft |
| 600: bed | 610: opening |
| 630: transport guide | 710: first-axial sliding block |
| 720: first-axial sliding rail | 730: second-axial sliding block |
| 740: second-axial sliding rail | 750: third-axial sliding block |
| 760: third-axial sliding rail | 800: tool |
| 900: tool magazine | |

The invention claimed is:

1. A machine tool comprising:
a base having a mounting space inside, in which a workpiece is mounted, wherein the base has shaft holes through a pair of opposing walls, and the base further has a pair of first-axial slides;
a saddle coupled to the pair of first-axial slides of the base to slide in a first axis direction, the saddle having a pair of opposing second-axial slides, and a respective longitudinal axis of each of the second-axial slides extends parallel to a second axis direction that crosses the first axis direction;
a crosspiece coupled to the pair of second-axial slides of the saddle to slide in the second axis direction and having a pair of opposing third-axial slides, and a respective longitudinal axis of each of the third-axial slides extends perpendicular to a plane, which is formed by the first axis direction and the second axis direction;
a vertical ram coupled to the pair of third-axial slides of the crosspiece to slide in a third axis direction perpendicular to the plane formed by the first axis direction and the second axis direction, and the vertical ram holding a first tool mounted at an end thereof to machine the workpiece; and
a table disposed in the mounting space of the base so as to be able to rotate relative to the base through the shaft holes of the base,
wherein the base has formed in a bed thereof an opening for discharging machined chips or cooling water,
wherein the pair of walls of the base include a first wall and a second wall that are disposed on opposite sides of the mounting space, and one of the pair of first axial-slides is disposed at an upper end of the first wall and the other of the pair of first axial-slides is disposed at an upper end of the second wall, and an intermediate wall extends in the second axis direction from the first wall to the second wall, and the mounting space is defined by the pair of walls and the intermediate wall, and
wherein one or more drain holes for the cooling water are formed in the intermediate wall, and a top surface of the intermediate wall is sloped at an angle towards the one or more drain holes.

2. The machine tool of claim 1, wherein the top surface of the intermediate wall is an inclined surface having a downward slope toward the mounting space so the machined chips produced when the workpiece is machined are collected.

3. The machine tool of claim 1, wherein a work space is defined ahead of the intermediate wall, an automatic tool changer having a plurality of tools, including the first tool, for machining is disposed behind the intermediate wall, and a front surface of the first wall and a front surface of the second wall are each inclined such that a lower end thereof is positioned rearward further than an upper end thereof, thereby defining the work space.

4. The machine tool of claim 1, wherein support feet are formed in a front-rear direction at a lower end of the base, and the support feet and the pair of opposing walls are arranged to make a triangle.

5. The machine tool of claim 1, wherein the pair of first-axial slides are formed such that rear portions thereof are longer than front portions thereof from centers of the shaft holes.

6. The machine tool of claim 1, wherein the saddle has a hexahedral box shape and has portions, which are connected to the pair of first-axial slides, at edges of a bottom thereof, and the pair of second-axial slides are formed at edges of a top surface of the saddle to be perpendicular to the pair of first-axial slides.

7. The machine tool of claim 1, wherein a vertical through-hole is formed in the vertical ram, and edges having a curvature are formed on an inner surface of the vertical through hole.

8. The machine tool of claim 1, wherein portions of the crosspiece that are to be connected to the pair of second-axial slides and portions of the vertical ram that are to be connected to the pair of third-axial slides make a right angle.

9. The machine tool of claim 1, wherein
the pair of first-axial slides, include: first sliding rails that longitudinally extend; and first sliding blocks that are pieces respectively coupled to the first sliding rails so as to be able to slide along the first sliding rails, and the first sliding rails and the first sliding blocks can be installed at opposite positions to one another, and
the pair of second-axial slides, include: second sliding rails that longitudinally extend; and second sliding blocks that are pieces respectively coupled to the second sliding rails so as to be able to slide along the second sliding rails, and the second sliding rails and the second sliding blocks can be installed at opposite positions to one another, and
the pair of third-axial slides, include: third sliding rails that longitudinally extend; and third sliding blocks that are pieces respectively coupled to the third sliding rails so as to be able to slide along the third sliding rails, and the third sliding rails and the third sliding blocks can be installed at opposite positions to one another.

* * * * *